Patented Aug. 31, 1943

2,328,021

UNITED STATES PATENT OFFICE 2,328,021

DERIVATIVES OF AMINES

Morris Katzman and Albert K. Epstein, Chicago, Ill., assignors to the Emulsol Corporation, Chicago, Ill.

No Drawing. Application July 17, 1940,
Serial No. 345,982

4 Claims. (Cl. 260—561)

This invention relates to new chemical compounds which are, in general, of the quaternary ammonium type, and are characterized by possessing interface modifying properties rendering the same highly useful for the purposes for which such agents are employed in the various arts.

While, in many instances, the novel compounds are best defined in the form of reaction products of stated materials, at least most of them may be considered as falling within the scope of the general formula

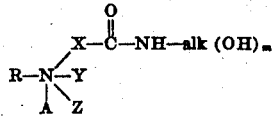

wherein R is an organic carbon-containing radical, preferably containing at least 4 and particularly from 8 to 18 carbon atoms, A is an anion, preferably of a solubilizing character, X is alkylene, arylene, or substituted alkylene or arylene, alk-(OH)$_m$ is hydroxy-alkyl and $m$ is a small whole number, particularly 1, 2 or 3, Y and Z are hydrogen, alkyl, cycloalkyl, hydroxyalkyl, aralkyl, aryl or

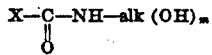

where X and alk(OH)$_m$ have the same significance set forth hereinabove.

A more limited aspect of the compounds of the invention may be represented by the general formulae

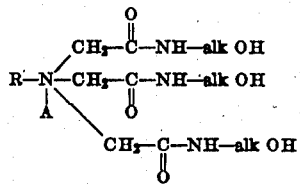

and

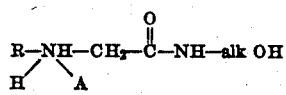

wherein R is a hydrocarbon radical containing from 8 to 18 carbon atoms, A is halogen, particularly, chlorine or bromine, and alk OH is hydroxyalkyl.

The radical R in the above formulae may be of aliphatic, cycloaliphatic, aromatic or aromatic-aliphatic character, and may contain substituent groups such as amino, hydroxy, halogen, sulphate, sulphonic, phosphate, carboxyl, nitrile, and the like, as will be pointed out hereinafter, but it is particularly preferred that it be unsubstituted aliphatic or fatty and contain upwards of ten carbon atoms to about eighteen carbon atoms. Z and alk likewise may contain substituent groups such as those just mentioned and the sequence of carbon atoms therein may be interrupted by O, S, C=O, NH, NR where R is alkyl, and the like.

In order that the nature of the invention may become apparent, there are listed hereinbelow representative compounds which fall within the scope of the invention.

(1)

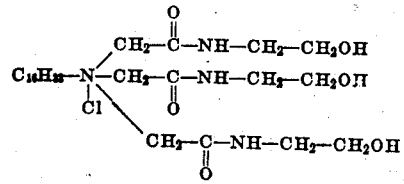

(2)

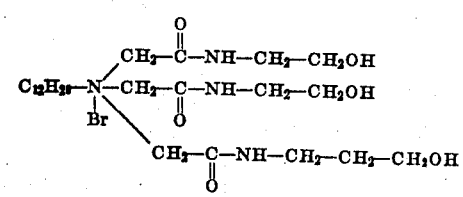

(3) 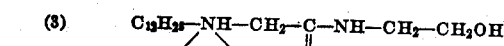

(4) 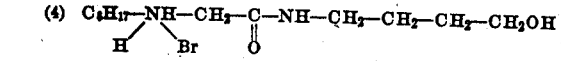

(5)

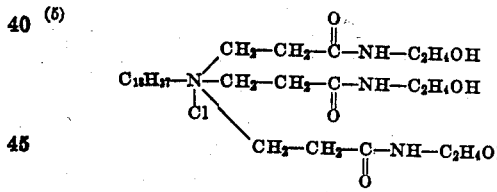

(6)

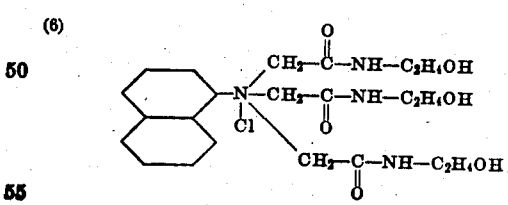

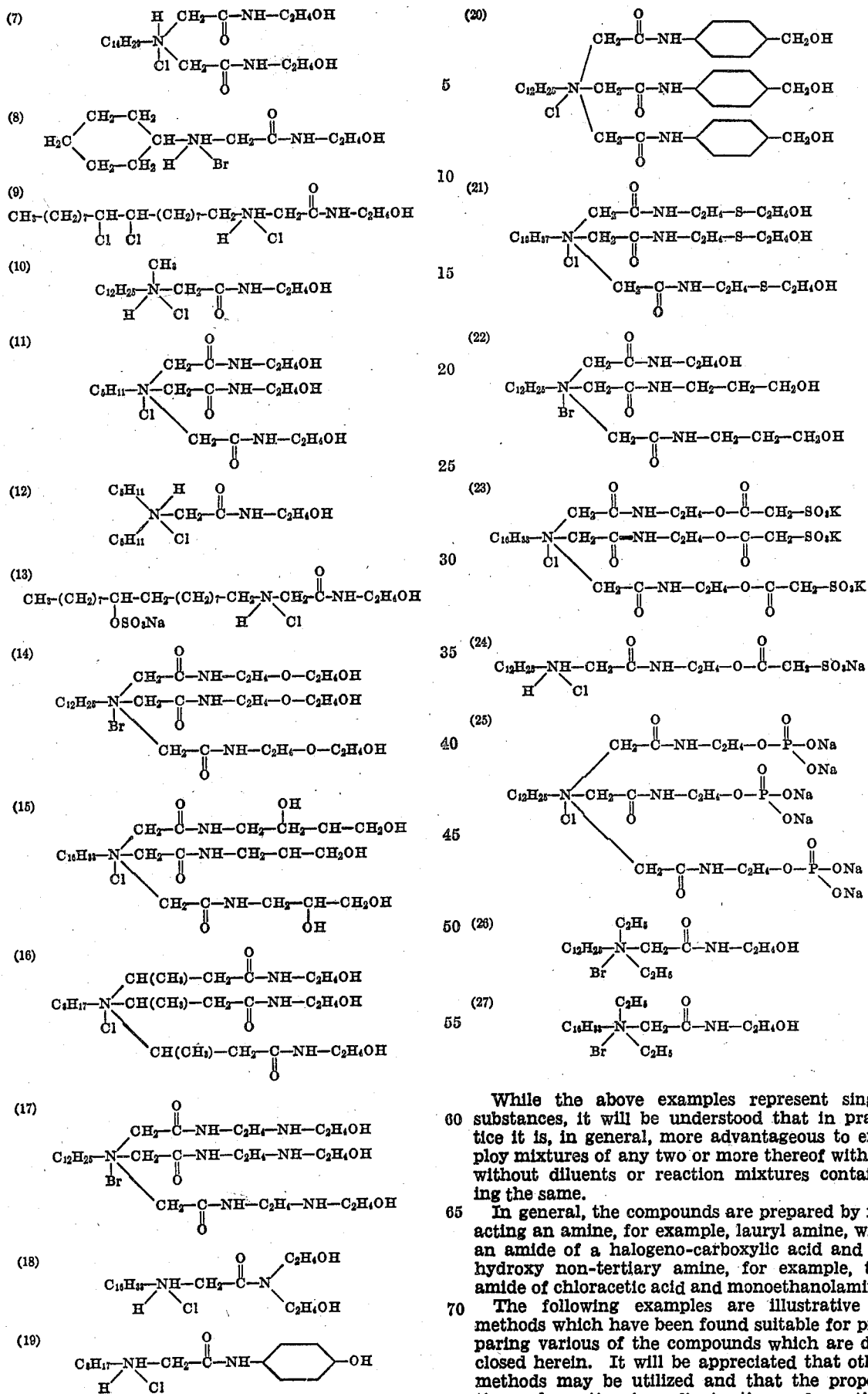

While the above examples represent single substances, it will be understood that in practice it is, in general, more advantageous to employ mixtures of any two or more thereof with or without diluents or reaction mixtures containing the same.

In general, the compounds are prepared by reacting an amine, for example, lauryl amine, with an amide of a halogeno-carboxylic acid and an hydroxy non-tertiary amine, for example, the amide of chloracetic acid and monoethanolamine.

The following examples are illustrative of methods which have been found suitable for preparing various of the compounds which are disclosed herein. It will be appreciated that other methods may be utilized and that the proportions of reacting ingredients, times of reaction, order of steps, and temperatures may be varied and that supplementary processes of purification and the like may be resorted to wherever found desirable or convenient. These and other variations and modifications will be evident to those skilled in the art in the light of the guiding principles which are disclosed herein.

*Example A*

21.7 grams of coconut oil mixed amines and 15 grams of the chloroacetamide of monoethanolamine

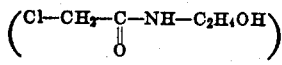

were mixed together at room temperature, the temperature spontaneously rising to about 100 degrees C. within a period of 5 to 6 minutes. The reaction mass was then heated for 1¼ hours on a boiling water bath. The final product was a semi-viscous liquid, soluble in water, and had good foaming properties. It contained a substantial proportion of a compound having the following formula

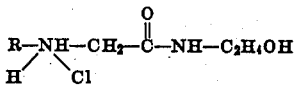

(R—NH being the radical of the coconut oil mixed amines comprising, largely, lauryl amine).

*Example B*

21.4 grams of coconut oil mixed amines and 45.2 grams of the chloracetamide of monoethanolamine were heated for ½ hour at a temperature ranging from 65 degrees C. to 98 degrees C. To the resulting reaction mass, 169 cc. of 0.508 N alcoholic KOH were added. The precipitate of KCl which formed was filtered off and the clear alcoholic solution was again heated for 2 hours at a temperature ranging from 70 degrees C. to 90 degrees C. The reaction mass was then cooled and 95 cc. of 0.508 N alcoholic KOH were again added. The precipitated KCl was again filtered off and the clear alcoholic solution was heated for 2 hours more on a boiling water bath. The alcohol was allowed to evaporate during this period of heating. To the resulting product there were added 68 cc. of 0.509 N alcoholic KOH. The precipitated KCl was again filtered off and the clear solution was again evaporated on a boiling water bath for a period of 5 to 6 hours. The product, on cooling, was a viscous, clear brown liquid which was soluble in water and foamed well both in acid and alkaline media. It contained a substantial proportion of a compound having the following formula:

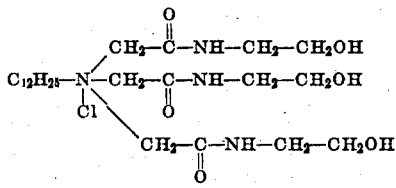

The organic radical represented by R in the general formulae set forth hereinabove may be derived from various sources. Such sources include, for example, mono-, di-, and poly-amines, simple and compound, normal and iso-, of aliphatic, cyclo-aliphatic, aromatic or aromatic-aliphatic character including, particularly the aliphatic straight chain and branched chain amines, for example, ethyl amine, propyl amine, isopropyl amine, butyryl amine, amyl amine, iso- amyl amine, hexyl amine, heptyl amine, octyl amine, nonyl amine, decyl amine, undecyl amine, dodecyl amine, myristyl amine, cetyl amine, oleyl amine, linoleyl amine, stearyl amine, ricinoleyl amine, palmitoleyl amine, melissyl amine, ceryl amine, carnaubyl amine, myricyl amine, branched chain octyl, decyl, dodecyl, tetra-decyl, hexadecyl, and octadecyl aliphatic amines as, for example, 2-ethyl hexyl amine-1, 2-n butyl octyl amine-1, 2-butyl tetra decyl amine-1, and, in general, the higher molecular weight saturated and unsaturated aliphatic straight chain and branched chain amines, those containing from 12 to 18 carbon atoms being particularly suitable. Other amines from which the radical R may be derived are cyclo-aliphatic or ali-cyclic amines and aromatic aliphatic amines such as cyclohexyl amines, aniline, benzylamine, p-amino phenol, diamino phenols, and homologues and derivatives thereof, monoethyl aniline, and the like. As previously pointed out, these amines may contain substituent groups of the character mentioned hereinabove. It is obvious, of course, that mixtures of any two or more of the above mentioned and similar amines may be utilized and, indeed, in commercial practice it will usually be found that commercial mixtures of such amines are more readily available and, therefore, more economical to employ.

It has previously been indicated that the anion represented by the letter A in the general formulae illustrating many of the novel agents of the present invention is preferably a solubilizing anion such as chlorine, bromine or iodine. Other anions may be substituted therefor as, for example, $OH^-$, $HSO_4^-$, $RSO_4^-$, $C_6H_5SO_3^-$, $NO_3^-$, acetate, propionate, caproate, laurate, oleate, stearate, borate, phosphate or some other organic or inorganic anion. The halogen anion derivatives are especially useful.

The halogen-carboxylic acids or other derivatives thereof, preferably in the form of their esters with ethyl alcohol or the like, which are reacted with the alcohol primary and secondary amines to form the halogen-carboxylic acid amides of the alcohol amines which are used in the reaction with the amines such as lauryl amine may be selected from a relatively large class including mono-, di- and poly-carboxylic derivatives as, for example, mono-chloracetic acid, mono-bromacetic acid, chloracetic chloride, bromacetyl bromide, mono-iodoacetic acid, alpha-chlor propionic acid, alpha-brom propionyl bromide, alpha-chlor butyric acid, alpha-bromo capric acid, mono-chlor succinyl chloride, di-chlor succinyl chloride, mono-chlor succinic acid, di-chlor succinic acid, di-chlor glutaric acid, di-chlor glutaryl chloride, nitro-chloro-benzoyl chlorides, and the corresponding halogeno-derivatives of malonic acid, citraconic acid, mesaconic acid, itaconic acid, mucic acid, adipic acid, pimelic acid, sebacic acid, suberic acid, azelaic acid, aconitic acid, phthalic acid, and the like.

The alcohol primary and secondary amines or alkylolamines which are reacted with the chloracetyl chloride or the like to produce the halogen-containing amides include, among others, by way of example, monoethanolamine, diethanolamine, mono-propanolamine, dipropanolamine, mono-butanolamine, dibutanolamine, mono-pentanolamine, dipentanolamine, mono-hexanolamine, dihexanolamine, ethyl mono-ethanolamine; mono-ethyl ether of diethanolamine;

mono-cyclohexyl, beta-hydroxy-ethyl amine; N-beta-hydroxyethyl aniline; 2-methylamino-propan-diol-1,3; 1-phenyl-amino-propan-diol 2,3; 1-hydroxy-ethylamino-2, methoxy-propanol-3; 2-N-methyl-amino-propan-diol-1,3; monoethanol monopropanolamine, monoethanol monobutanolamine, glycerol mono-amines, namely, 1-amino-2,3-propanediol and 2-amino-1,3-propanediol; diglycerolamine; hydroxylamine (H₂N—OH) and derivatives thereof such as result from replacement of one amine hydrogen by an alkyl such as methyl, ethyl, propyl, butyl and the higher homologues; hydroxy amines, particularly secondary hydroxy amines, derived from polyhydric alcohols, including sugars and sugar alcohols such as dextrose, sucrose, sorbitol, mannitol and dulcitol,

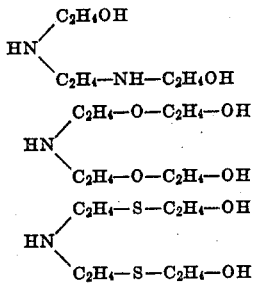

and the like; 2-amino-2-methyl-1,3-propanediol; trimethylol amino methane; 2-amino-2-n-propyl-1,3-propanediol; 2-amino-2-isopropyl-1,3-propanediol; 2-amino-2-methyl-1,4-butanediol; 2-amino-2-methyl-1,5-pentanediol; 2-amino-2-ethyl-1,3-propanediol; 2-amino-2-ethylol-1,3-propanediol; 2-amino-2-methyl-1,6-hexanediol; 1-amino-1,1-dimethyl ethanol; trimethylol amino-methyl methane; trimethylol amino-methylol methane. The glycerol mono-amines and the related hydroxy amines such as various of those disclosed hereinabove may be prepared by various procedures and in different ways. Many of them are conveniently produced by nitrating paraffin hydrocarbons, substituting methylol groups for hydrogen on the carbons to which the nitro groups are attached, and then reducing the nitro groups to amine groups. These amine groups may be further alkylated or otherwise substituted if desired. Still other alcohol amines include polymerized non-tertiary hydroxy amines or polymerized hydroxy amines containing hydrogen directly attached to nitrogen and prepared, for example, by polymerizing monoethanolamine or diethanolamine or mixtures thereof, or other hydroxy amines such as those mentioned hereinabove, particularly in the presence of a catalyst such as sodium hydroxide or the like. The preparation of polymerized hydroxy amines is disclosed, for example, in United States Patent No. 2,178,173; and homologues and substitution derivatives of the above-mentioned hydroxy amines.

As shown in Examples 23, 24 and 25, there are also included within the scope of the present invention derivatives such as those produced by the introduction of hydrophillic groups into the previously described compounds. These hydrophillic groups may be of varying character such as, for example, sulphonates, phosphates, pyrophosphates, tetraphosphates, metaphosphates, borates, sulphocarboxylic acid radicals containing not more than 8 carbon atoms and preferably from 2 to 4 carbon atoms, including, among others, sulphoacetate, sulphopropionate, sulphobutyrate, sulphosuccinate, sulphomaleate, sulphoglutarate, sulphomucate, sulphoadipate, sulphosebacate, sulphophthalate, sulphoaconitate, sulphobenzoate, and the like. Other hydrophillic groups may be introduced which contain, for example, nitrogen, and which tend to enhance the water-solubility or water-dispersibility of the compounds into which such radicals are introduced. It will be understood that either one or more of such hydrophile radicals may be introduced into the compounds.

In addition to, or independently of, the introduction of the aforementioned hydrophillic groups into the molecules of the compounds of the present invention, the latter may also have introduced thereinto alkyl or acyl groups to make ether or ester derivatives. Thus, for example, compounds such as those illustrated by Examples 16 and 17 may be reacted to produce esters with acetic acid, propionic acid or higher molecular weight carboxylic acids such as those derived from natural oils and fats as, for example, lauric acid, oleic acid, stearic acid, palmitic acid, myristic acid, and the like, or the acyl halides of such acids. Considering the compounds 16 and 17, for example, one of the free hydroxy groups may be esterified with a carboxylic acid or acyl halide of the character mentioned and another of the hydroxy groups may be reacted to introduce a hydrophile group as previously described. The introduction of the alkyl or acyl or hydrophile groups or both alkyl or acyl and hydrophile groups into the molecules of the compounds described herein results in the production of novel compounds having many interesting and useful interface modifying properties.

The compounds of this invention have utility in the various arts in which interface modifying agents are employed. They are resistant to precipitation by calcium and magnesium salts and are compatible with acid and alkali media. They may be utilized in washing and laundering and the textile and related industries wherein they function for softening, wetting, detergent, emulsifying, penetrating, dispersing, frothing and foaming purposes. The textiles, various treatments of which in the presence of the agents of the present invention are rendered effective, comprise natural products such as cotton, wool, linen and the like as well as the artificially produced fibres (and fabrics), such as rayon, cellulose acetates, cellulose ethers and similar artificial products. It will be understood, of course, that the agents may be used in aqueous and other media either alone or in combination with other suitable salts of organic or inorganic character or with other interface modifying agents. In the dyeing of textiles they may be employed as assistants in order to bring about even level shades. They may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of cosmetic creams such as cold creams, vanishing creams, tissue cream, shaving creams of the brushless and lathering type and similar cosmetic preparations. They possess antiseptic, bactericidal and germicidal properties even when used in quite highly dilute aqueous solutions so that they are well adapted for medicinal and allied purposes. Another use to which the agents of the present invention may be placed is for the treatment of paper pulp and paper where they may be employed, for example, as penetrating agents in the cooking of the paper pulp or the like. Their capillary or interfacial tension reducing properties enables them to be employed in the fruit and vegetable industry in order to effect the removal from fruits and the like of arsenical and similar sprays. They possess marked utility in the ore dressing industry wherein they function effectively in froth flotation processes, particularly for the separation of silica from ores containing the same. Their interface modifying properties also permit their use in lubricating oils and the like enabling the production of effective boring oils, cutting oils, drilling oils, wire drawing oils, extreme pressure lubricants and the like. They may also be used with effect in the preparation of metal and furniture polishes, shoe polishes, in rubber compositions, for breaking or demulsifying petroleum emulsions such as those of the water-in-oil type which are encountered in oil field operations, and for various other purposes which will readily occur to those versed in the art in the light of the disclosure herein.

As detergents, they may be employed for the preparation of shampoos, dentifrices and the like. In general, they may be dissolved in water or aqueous media and utilized in that form or, in the case of solid products, they may be packaged and sold in such form preferably mixed with diluents. They may also be utilized for commercial cleansing, laundering and washing operations with marked advantage.

The products of the present inventions may be employed alone or together with lesser or greater quantities of inorganic or organic compounds. Thus, for example, they may be employed together with salts such as sodium chloride, alkali metal phosphates including pyrophosphates and tetraphosphates, sodium sulphate, alums, perborates such as sodium perborate, and the like. They may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophillic gums including pectin, tragacanth, karaya, locust bean, gelatin, arabic and the like, glue, vegetable, animal, fish and mineral oils, solvents such as carbon tetrachloride, monoethyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alkyl sulphates, phosphates, pyrophosphates and tetraphosphates, as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulphocarboxylic acid esters of higher molecular weight alcohols such as lauryl sodium sulphoacetate, dioctyl sodium sulphosuccinate, dilauryl potassium sulpho-glutarate, lauryl monoethanolamine sulphoacetate, and the like; sulphuric and sulphonic derivatives of condensation products of alkylolamines and higher fatty acids; phosphoric, pyrophosphoric and tetraphosphoric acid esters of higher molecular weight alcohols; Turkey-red oils; compounds of the type of isopropyl-naphthalene sodium sulphonate, and other classes of wetting agents.

Wherever the term "higher" is employed as referring to higher molecular weight organic acids or the like, it will be understood to cover compounds or radicals having at least six carbon atoms unless otherwise specifically stated.

What we claim as new and desire to protect by Letters Patent of the United States is:

1. Chemical compounds in accordance with the general formula

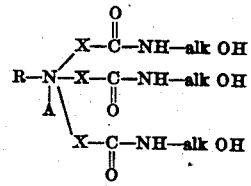

wherein R is a hydrocarbon radical containing from 8 to 18 carbon atoms, A is halogen, X is alkylene, and alk OH is hydroxy alkyl.

2. Chemical compounds in accordance with the general formula

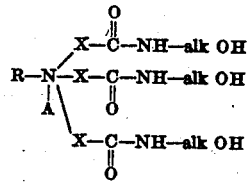

wherein R is an aliphatic hydrocarbon radical containing from 8 to 18 carbon atoms, A is halogen, X is alkylene, and alk OH is hydroxy alkyl.

3. Chemical compounds in accordance with the general formula

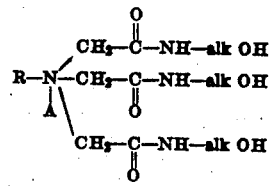

wherein R is an aliphatic hydrocarbon radical containing from 8 to 18 carbon atoms, A is halogen, and alk OH is hydroxy alkyl.

4. Chemical compounds in accordance with the general formula

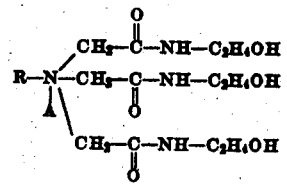

wherein R is an aliphatic hydrocarbon radical containing from 8 to 18 carbon atoms, and A is halogen.

MORRIS KATZMAN.
ALBERT K. EPSTEIN.